United States Patent [19]

Minter

[11] 4,267,700
[45] May 19, 1981

[54] CONTAINER METHOD AND APPARATUS

[76] Inventor: Buryl Minter, P.O. Box 655, Chugiak, Ak. 99567

[21] Appl. No.: 88,192

[22] Filed: Oct. 23, 1979

[51] Int. Cl.³ .................... F25C 1/18; F28C 1/00; F25D 3/08
[52] U.S. Cl. .................................... 62/70; 62/121; 62/372; 62/457; 206/508; 206/519
[58] Field of Search .............. 206/518, 519, 520, 508, 206/509, 511, 515; 62/DIG. 13, 371, 372, 314, 529, 530, 457, 431, 438, 459, 464, 69, 70, 121, 185, 306

[56] References Cited

U.S. PATENT DOCUMENTS

| | | | |
|---|---|---|---|
| 1,159,058 | 11/1915 | Manns | 62/70 |
| 3,205,677 | 9/1965 | Stoner | 62/457 |
| 3,759,416 | 9/1973 | Constantine | 206/508 X |
| 4,024,951 | 5/1977 | Green | 206/519 |
| 4,042,111 | 8/1977 | Smith | 206/508 |
| 4,096,947 | 6/1978 | Morse | 206/519 |

Primary Examiner—Lloyd L. King
Attorney, Agent, or Firm—James C. Wray

[57] ABSTRACT

A cold temperature chilling storage and transportation container specifically is used for fish. The space between double walls of regular or cross-linked polyethylene is filled with polyurethane foam. The outer bottom wall has nine legs formed integrally therewith. The inner bottom wall slopes to a recessed one inch opening in which a plug may be inserted. The upper half of the sidewalls extends outward about an inch and a half on each side so that empty containers may be telescoped. A cover overhangs the outer wall and has lower recesses to receive the sidewall. Nine upper recesses in the cover receive legs of the bottom wall for stacking the containers. The legs enable a forklift to be inserted from either side. A hollow double walled air manifold fits within the bottom and has a nipple to which an air hose may be connected. In use, ice is placed in the container; later, salt water and fish are added. Air under one hundred pounds a square inch is released through the manifold bubbling through the saline ice mixture and quickly chilling the fish. The air hose is left attached or may be quickly disconnected from the manifold, and the cover is placed on the box, maintaining the fish in chilled condition over an extended period of time.

7 Claims, 8 Drawing Figures

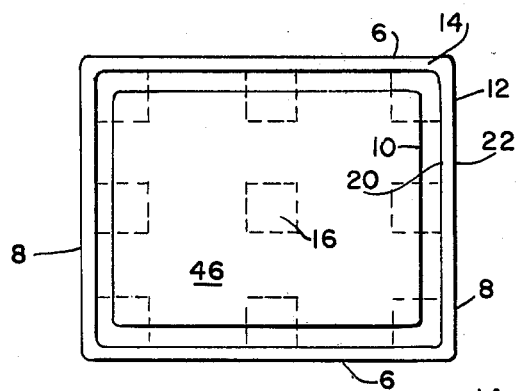
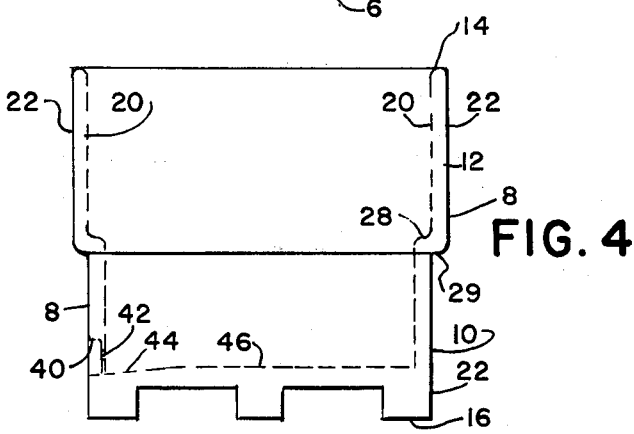
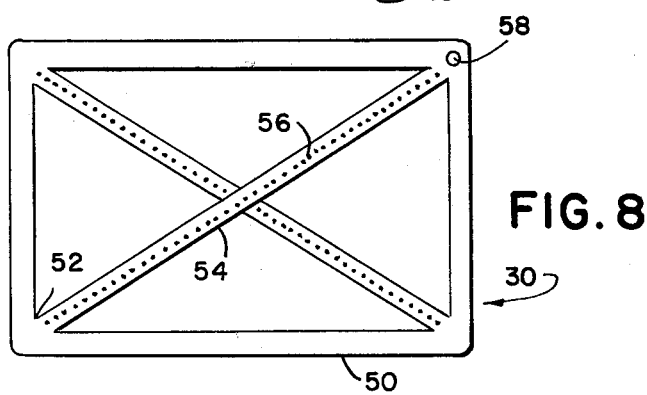
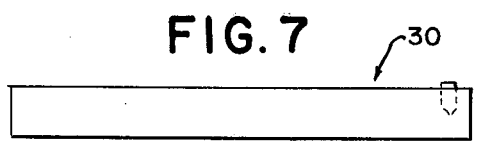
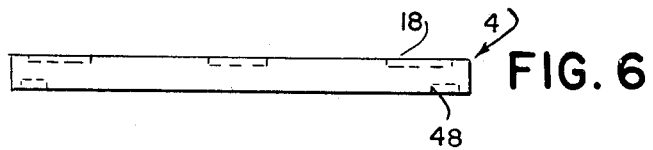

CONTAINER METHOD AND APPARATUS

BACKGROUND OF THE INVENTION

This invention relates to chilling, storing, and shipping of materials which require low temperature maintenance. A primary example of such material is fish.

Food fish require rapid chilling and low temperature maintenance during holding and shipping to maintain their freshness and flesh quality. At the same time, it is highly desirable to reduce handling of fish to a minimum and to prevent excessive pressure on the fish while rapidly chilling a fish and preserving temperatures in precise low ranges.

Historically, fish have been consumed as quickly as possible after harvesting. Cool weather conditions and ice extend the times between catch and consumption, processing and freezing or preserving.

Before the wide availability of ice, it was common for fishing boats to take on quantities of salt which were used to intermix with the fish to preserve the fish until off-loading from a boat. It is common now for fishing vessels to take on a large quantity of ice before enbarking for several days of fishing. As the catch is stored in the hold, ice is intermingled with the fish or fish and ice are stored in alternating layers to preserve the fish at low temperatures until the catch is off-loaded.

Types of fish differ in handling requirement. Some fish may be readily stored at reduced temperatures in the intact form as they are caught. Others require gutting before satisfactory storage. Some fish may be tightly packed to several feet-in depth without destroying the qualities of the fish. Values of other fish may be greatly reduced by excessive pressures of overlying fish and ice. Slow cooling of some fish is acceptable, while others require rapid chilling to preserve their valuable qualities. Some fish may not be damaged by handling and conveyor belts associated with bulk storage. Other fish are easily damaged and their value greatly reduced by handling.

As an improvement on bulk storage, several methods of fish handling and storing have been devised. In one such method fish are placed in rough boxes and the boxes are transferred to the hold with a layer of ice being shoveled into the top of each box before the boxes are stacked. Sides of the boxes may partially support the weight, but the great bulk of the weight is supported by the fish within the boxes. Icing may be uneven.

It has been proposed to place a measured quantity of ice in the bottom of boxes and to place the boxes in stacks in ships' holds. The boxes are unstacked, filled with fish, and restacked.

It has also been proposed to place large removable tanks in the holds of ships. Seawater is added to ice in the bottoms of the tanks before fish are chuted through hatches in the tank tops. When the tank is filled, pressurized air is released in the bottom of the tank, bubbling the water melting the ice and stirring the slush through the fish. That system results in rapid chilling of the fish but has an added drawback in that complex handling and emptying equipment is required.

The large bulk of the tanks requires heavy construction which is dead weight as far as cargo is concerned. Smaller containers of the prior art either have little strength or require metal reinforcements and attendant heavy weights to meet strength requirements. Small containers of the prior art have little lateral stability which is especially important in handling and in storing aboard ship. Systems of the prior art include devices which are too large to be handled without special equipment in their empty condition or which are too small to provide economically viable packaging in their loaded condition.

The system of the present invention overcomes and avoids these and other problems of the prior art.

One advantage of this invention is the ability of chilling fresh fish rapidly. While leaving the fish in the container, they may be shipped to any location throughout the world. Without the use of refrigeration, the temperature of the fish will remain very low for a great length of time. The invention itself, as can be seen from the above, is designed at least as much for air transport as well as sea and other modes of transport.

SUMMARY OF THE INVENTION

The container method and apparatus of the present invention have unique structures, advantages, and uses.

The containers are light weight and their sandwich walls provide high strength and insulation and enable several loaded containers to be stacked. The construction of the containers permits telescopic stacking and promotes easy separation and provides for handling of the containers by hand in the case of empty containers and with conventional widely available forklift devices in the case of loaded containers. The weight of stacked containers is borne entirely by the walls, and materials within the containers do not bear the weight of overlying containers.

The particular structure of the containers provides lateral bracing to adjacent stacks of containers in full and empty conditions. A space for premeasured quantities of ice is provided in the telescopically stacked containers without creating pressure on the ice which promotes heat and untimely absorbing of energy and melting of the ice. Legs of one box rigidly interfit in covers of another with adequate access for insertion of lifting forks from ends or sides of the containers. Sloped bottom walls and recessed drains permit stacking plugged containers and draining of containers before handling.

New separate manifolds packed under ice in each container provide controlled air release and uniform seawater slush chilling of contents.

In one example, a container apparatus and method of the present invention is used for the chilling, storing, and transporting of fish. In a specific preferred embodiment of the container, the space between the double walls of cross linked polyethylene is filled with polyurethane foam. The outer bottom wall has nine legs formed integrally therewith. The inner bottom wall slopes to a recessed one inch opening in which a plug may be inserted. The upper half of the sidewalls extends outward about an inch and a half on each side so that empty containers may be telescoped. A cover overhangs the outer wall and has lower recesses to receive the sidewall. Nine upper recesses in the cover receive legs of the bottom wall for stacking the containers. The legs enable a fork lift to be inserted from either side. A hollow double-walled air manifold fits within the bottom and has a nipple to which an air hose may be connected. In use, ice is placed in the container; later, salt water and fish are added. Air under one hundred pounds a square inch is released through the manifold bubbling through the saline ice mixture and quickly chilling the fish. The air hose is left attached or may be quickly disconnected from the manifold, and the cover is placed on the box, maintaining the fish in chilled condition over an extended period of time.

The invention provides a low temperature double-walled container having inner and outer walls with an insulating material between the inner and outer walls in the bottom wall, side walls, and end walls. Lower portions are disposed inwardly of upward portions of the walls so that the containers may be nested. Means are associated with the upper edges of the side and end walls whereby similar containers may be stacked, with weight of upper containers being supported by upper edges of lower containers.

Preferably, the outer and inner walls are constructed of cross linked polyethylene, and the insulating material between the walls is polyurethane foam.

In a preferred embodiment a cover rests on upper edges of the side and end walls. Preferably the cover has a continuous downward opening recess in a lower face near an outer edge thereof for receiving upper edges of the side and end walls. The container has a plurality of legs formed in downward extension on an outer bottom wall, and the cover has a like plurality of complementary upward opening recesses for receiving legs of a next above container in a stack of similar containers. Preferably the recesses are relatively shallow, and the legs are relatively long, whereby lower portions of the legs fit within the recess and upper portions of legs extend outward from the recesses. A fork of a forklift may be inserted between a cover and a bottom of a next above container in a stack of containers by inserting the forks between the legs.

In the preferred embodiment nine legs are arranged in three rows of three legs each. The legs are formed integrally with the outer bottom wall, and the insulating material extends into the legs. Outer legs are formed in downward extension of outer side and end walls of the container. A continuous annular generally horizontal shelf is formed in the inner wall between the upper and lower portions of the side and end walls. The outer legs are juxtaposed with the shelf during stacking of containers.

Preferably, the container's inner bottom wall is slightly sloped. A drain in a lower portion of a vertical wall near a lower portion of the sloping inner bottom wall drains fluid from the container.

An area of an outer wall adjacent the drain is inwardly recessed so that a head of a drain plug protruding from the drain may be positioned within the recess.

In the preferred container a gas manifold for positioning on an inner wall of a bottom of a container has a hollow portion for distributing gas. Openings in a wall of the hollow portion release gas, and a connection connects a gas supply with the manifold. Preferably the connection is a nipple extending outward from the manifold for receiving an end of a tube from a gas supply. In the preferred embodiment the container has a generally rectangular bottom wall and the manifold is an annular, generally rectangular tubular structure for fitting within the lower portions of the side walls and end walls adjacent the inner bottom wall. Solid or cross tubular members extend between opposite corners of the annular rectangular tubular structure.

In the preferred method, the invention uses containers for transporting and chilling materials. Steps include placing a manifold in a bottom of a container, placing ice in the bottom of the container and on the manifold, stacking a number of containers having manifolds and ice, shipping the stacked containers, unstacking the containers, connecting a pressurized air supply to a manifold in a bottom of a container, adding water and materials to be cooled, supplying pressurized air to the manifold and bubbling air through the water and ice and materials, placing a cover on the container and stacking another similar filled container on the cover.

Preferably the initial stacking step includes stacking containers with legs of above containers resting on inner shelves formed midway on inner walls of lower containers, and for resting medial horizontally extended portions of an above container on upper edges of side and end walls of a lower container.

The stacking of the filled containers preferably is accomplished by placing legs of an above container within complementary recesses in a cover of a below container.

Connecting the manifold to a pressurized air source includes connecting a tube to the manifold. Preferably the tube is removed from the manifold prior to placing the cover on the container.

In a preferred embodiment a supply tube is connected to the manifold before ice is added to the container.

These and further objects and features of the invention are apparent in the disclosure which includes the specification with the above and ongoing description and claims and the drawings.

BRIEF DESCRIPTION OF THE DRAWINGS

FIG. 4 is a side elevation of the container.

FIG. 5 is a plan view of the container.

FIG. 6 is a side elevation of the container cover.

FIG. 7 is a side elevation of the manifold shown in FIG. 8.

FIG. 8 is a plan view of the manifold of the container.

DETAILED DESCRIPTION

Figure 1:
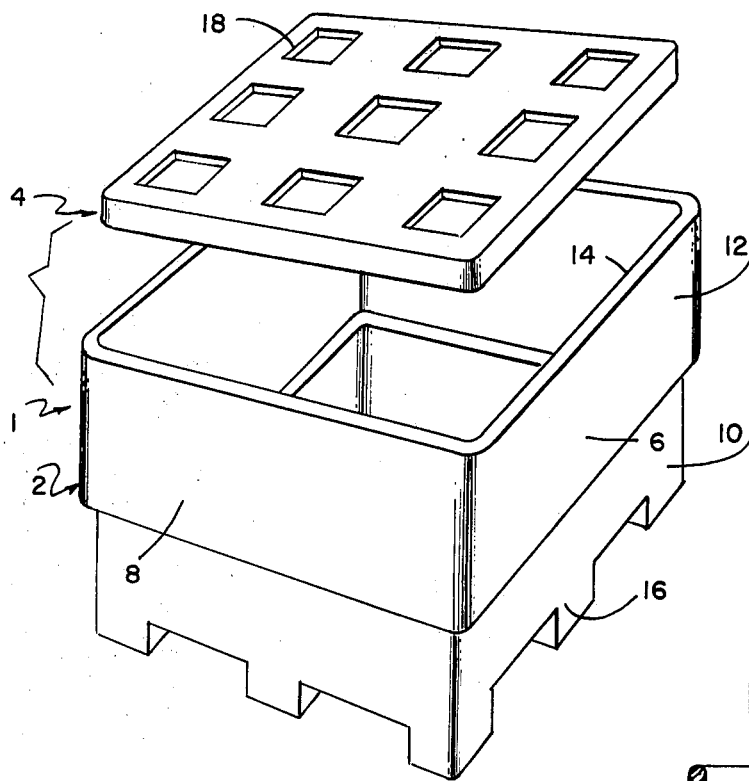
FIG. 1 is a perspective view of the container of the present invention.
Figure 2:
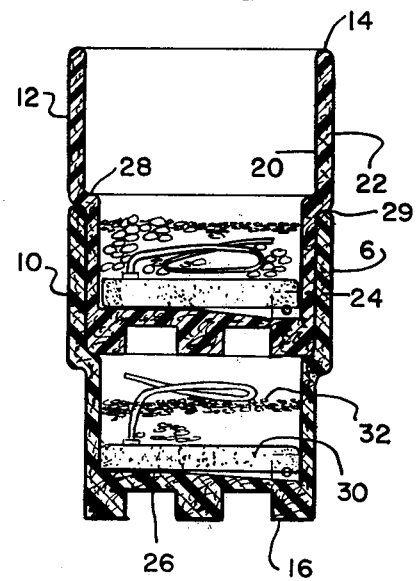
FIG. 2 is a cross-sectional view showing stacking of the containers.

Referring to FIG. 1, a container is generally referred to by the numeral 1. The container has a body 2 and cover or lid 4. The body 2 has opposite side walls 6 and opposite end walls 8. Each of the side walls and end walls has a lower portion 10 and an upper portion 12. The upper portions 12 terminate upwardly in an upper edge 14. Nine legs 16 are arranged in three rows in each direction across the bottom of the box. Cover 4 has nine recesses 18 for receiving lower ends of the legs. As shown in FIG. 2, the walls of the box are of double construction with an inner wall 20 and an outer wall 22. Preferably the inner and outer walls are formed of cross linked polyethylene for lightweight strength and toughness. The space between inner wall 20 and outer wall 22 is filled with polyurethane foam insulation 24. Inner wall 20 and outer wall 22 are joined upwardly at edge 14. As shown in FIG. 22, legs 16 are formed integrally with the outer wall 22 of the bottom wall 26, and the space within legs 16 is filled with the foam insulation material 24.

When the containers are stacked for shipping and storing before use, as shown in FIG. 2, outer legs 16 are positioned adjacent shelves 28 formed as a part of the inner wall 20. As seen in the drawings, the lower wall portions 10 are set inward from the upper wall portions 12, leaving the horizontal shelf 28 and an outer horizontally extending portion 29.

In the stacked condition, either outer legs 16 rest upon shelf 28 or horizontal extended areas 29 rest upon upper edges 14. Both conditions may be concurrent.

Figure 3:
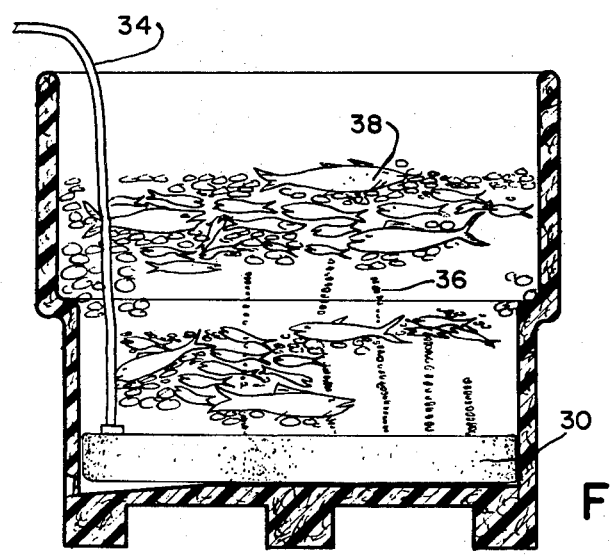
FIG. 3 is a cross-sectional view showing use of the containers of the present invention.

Before the containers are stacked, as for example, for loading in ships' hulls, an air manifold 30 is placed in the bottom of each container and measured portion of crushed or shaved ice 32 is added on top of the manifold. In use, as shown in FIG. 3, air is supplied through an air hose 34 connected to the manifold 30. A small amount of seawater is added to the container and air is bubbled through the manifold causing tiny streams of bubbles 36 released at various pressures to mix the cold slush and the fish 38 which have been added to the container.

The air hose 34 may be pulled from the nipple on the manifold before the cover is placed on a container or the air hose may be left in place or placed within the top of the container for later use if desired. In most cases, the air hose is disconnected, its entire intended use having been accomplished in quickly chilling the fish by stirring the frothing slush through the fish with the released fine air streams.

In FIG. 4, a recess 40 in the lower portion of end wall 8 has a drain 42 which communicates with an interior of the container near a lower portion 44 of the sloping bottom inner wall 46.

A plug (not shown) is inserted in the drain 42 before adding the measured amount of ice to the container. Recess 40 insures that the plug is not disturbed and clears the inside of the next adjacent container when the containers are telescoped for shipping. After the fish have been stored and before handling, the plug may be withdrawn from drain 42 to lighten the container.

As typical of the preferred embodiment of the invention, and for purposes of understanding the preferred embodiment and assisting one skilled in the art to construct the container of the present invention, the following representative dimensions of one embodiment are given.

Referring to FIG. 4 the distance between upper portions 12 of outer walls 22 of the end walls 8 is approximately 46". Similar dimensions between the upper portions 12 of the inner walls 20 is 42". The distance between the outer walls 22 of the lower portion 10 is about 41½" so that the lower portion 10 may fit within the upper portion 12 of the next lower container in a stack. The overall height of the container without the cover is about 42". The distance between the bottoms of legs 16 and the horizontally extending portion 29 is about 20", and the distance between the shelf 28 and the upper edge 14 is about 20". The walls are 2" with the material thickness of the linked polyurethane inner and outer walls being between ¼" and ½" thick, and with a fill of about 3 pounds of polyurethane foam. Drain 42 is formed of a sleeve or bushing of similar material which is fused or bonded or held in interference fit with the outer and inner walls. Legs 16 are about 4" high and from 5¾" to 6" in horizontal dimensions. Internal and external corners are formed as radii.

FIG. 5 shows a planned view of the container.

FIG. 6 shows an elevation of the cover 4. Upward opening recesses 18 are approximately ½" deep. Downward opening peripheral recess 48 which receives the upper edge 14 of the container box 2 is about ½" deep and 2¼" wide. The covers are shipped and stored separate from the container bodies 2 until the individual containers are filled with fish and are chilled. A cover 4 is placed on each container body and the next above container is stacked on the cover.

As shown in FIGS. 7 and 8, the air manifold 30 is formed of a rectangular tube or tray of cross linked polyethylene having a rectangular overall shape. The tube is approximately 1" in height with a wall thickness of about ⅛". Extending across opposite corners 52 of tube 50 are cross members 54. The cross members are in communication with the interior of the rectangular tube and each cross member has a plurality of openings 56 through which air under 100 psi. pressure is released. Nipple 58 receives the air supply hose 34, which is shown in FIG. 3. The manifold of the embodiment previously described has an overall dimension of about 28"×38" to fit within the bottom of the container.

In use, a manifold to which a short length of hose is connected, is placed in the bottom of each container. The container is filled mechanically with a premeasured amount of ice. The drains are plugged and the containers are telescopically stacked. A forklift places the containers on a flatbed truck and a fork-type hoist lifts the containers from a truck into the hold of a ship. Bailed groups of covers are separately transferred to the hold of a ship.

As fish are being received within the hold, a person working within the hold unstacks each container, adds a premeasured quantity of seawater and fills the container with fish. The air hose is connected to a pressurized air supply for a predetermined length of time, while other containers are being filled. The fish rapidly chill with the frothing slush before the air supply is disconnected and continually chill while the cover is placed on the container and the container is placed on another filled and covered container. The containers are continued to be filled, while stacks of the filled containers are wedged tightly against each other in the hold. The insulated walls maintain the low temperature within the containers. Ice continues to melt, maintaining the low temperature of the fish and brine.

Just before the containers are off-loaded to a processing facility, plugs are pulled and the cold brine is drained to lighten the containers. When shipment away from the docks is necessary, the cold brine is removed or left in the containers during further shipment. Alternatively, some or all of the brine may be drained and the covers may be briefly opened for top icing before further shipment. The containers of the present invention are of a size which may be conveniently handled by men and machines. Fish is rapidly chilled and is maintained at low temperature over long periods. Handling of the fish is reduced to a minimum and the fish are not subjected to heavy pressures. Consequently, fish packed and shipped in the container is maintained in its best possible condition. The fish may be shipped in the container directly to the processing facility or to the retailer or institutional user and the fish may be kept in the container until required. Empty containers and covers are rinsed and restacked for return to the icing station where they are unstacked, cleaned with high pressure jets, resupplied with ice, restacked and transferred to the ship hold for reuse.

During the cleaning operation immediately prior to reicing, the old manifolds which have the greatest number of surface discontinuities and therefore may be most difficult to clean, may be removed from the containers for separate cleaning and may be replaced by clean manifolds and hoses before icing.

While the invention has been described with reference to specific embodiments, modifications and variations of the invention may be constructed without departing from the scope of the invention. The scope of the invention is defined in the following claims.

I claim:

1. The method of using containers for transporting and chilling materials comprising placing a manifold in a bottom of a container, placing ice in the bottom of the container and on the manifold, stacking a number of containers having manifolds and ice, shipping the stacked containers, unstacking the containers, connecting a pressurized air supply to a manifold in a bottom of a container, adding water and materials to be cooled, supplying air to the manifold and bubbling air through the water and ice and materials, placing a cover on the container and stacking another similar container on the cover.

2. The method of claim 1 wherein the initial stacking step further comprises stacking containers with legs of above containers resting on inner shelves formed midway on inner walls of lower containers.

3. The method of claim 1 wherein the initial stacking comprises resting medial horizontally extended portions of an above container on upper edges of side and end walls of a below container.

4. The method of claim 1 wherein the stacking of the filled containers comprises placing legs of an above container within complementary recesses in a cover of a below container.

5. The method of claim 1 wherein connecting the manifold to a pressurized air source comprises connecting a tube to the manifold.

6. The method of claim 5 further comprising removing the tube from the manifold prior to placing the cover on the container.

7. The method of claim 1 further comprising the initial step of connecting a supply tube to the manifold.

* * * * *